US006600289B2

(12) United States Patent
George et al.

(10) Patent No.: US 6,600,289 B2
(45) Date of Patent: Jul. 29, 2003

(54) PORTABLE THREE-PHASE AC POWER SUPPLY FOR CHAIN HOIST MOTOR

(76) Inventors: David W. George, 235 E. Clairborne Pl., Long Beach, CA (US) 90807; Glenn R. Bracegirdle, 936 23rd St., San Pedro, CA (US) 90731; Joseph Peppard, 13119 Eastbrook Ave., Downey, CA (US) 90242

( * ) Notice: Subject to any disclaimer, the term of this patent is extended or adjusted under 35 U.S.C. 154(b) by 0 days.

(21) Appl. No.: 09/871,915

(22) Filed: Jun. 4, 2001

(65) Prior Publication Data

US 2002/0180400 A1 Dec. 5, 2002

(51) Int. Cl.[7] .............................. H02P 1/24; H02P 1/42; H02P 3/18; H02P 5/28; H02P 7/36

(52) U.S. Cl. .......................... 318/727; 307/9.1; 254/270

(58) Field of Search ........................... 318/727; 307/9.1, 307/77, 78; 254/264–270

(56) References Cited

U.S. PATENT DOCUMENTS 3,584,838 A * 6/1971 Tampin ...................... 254/284
5,160,852 A * 11/1992 Charles et al. ................ 307/77
6,209,852 B1 * 4/2001 George et al. .............. 254/270

* cited by examiner

*Primary Examiner*—Jeffrey Donels
(74) *Attorney, Agent, or Firm*—Charles H. Thomas

(57) ABSTRACT

A portable three-phase alternating current power supply is provided to drive one or more chain hoist drive motors. The portable power supply has a portable case for holding electrical components and includes a control panel that has at least one single-phase power input socket, and preferably a pair of three-phase motor power output sockets and a pair of motor control output sockets. Three-phase inverters are located in the portable case and are coupled to receive one or more single-phase 110 V alternating current power inputs and to provide three-phase, 208 V alternating current electrical power outputs through the three-phase motor power output sockets. Selector switches on the control panel are used to drive the chain hoist motors to raise and lower loads. Phase selection switches on the control panel synchronize the outputs of the inverters with the selector switch positions and associated indicators. An automatic power source selector automatically divides the electrical load of the three-phase inverters when more than one single-phase electrical power input is present.

18 Claims, 6 Drawing Sheets

PORTABLE THREE-PHASE AC POWER SUPPLY FOR CHAIN HOIST MOTOR

BACKGROUND OF THE INVENTION

1. Field of the Invention

The present invention relates to systems for powering motors for chain hoists that are mounted upon overhead supports and which lift and lower loads.

2. Description of the Prior Art

Chain hoists are utilized in many different applications to raise and lower loads suspended from overhead supports. A chain hoist is comprised of a heavy duty motor housed within a rugged casing and having at least one chain access opening in the casing. A chain may be suspended from an overhead support or from the chain hoist itself to carry a load. In either case the chain is routed around a chain drive internally located within the chain hoist casing. The chain drive gear within the casing is driven by the chain hoist motor.

Chain hoists are utilized extensively and in widely differing applications. They are used in shops, factories, warehouses, shipyards, exhibition halls, and theatrical stage sets. They are also used in numerous other types of commercial and industrial establishments.

The loads that usually must be lifted with chain hoists require rather heavy duty motors. Since the direction of chain movement must often be reversed, the motors that are utilized are typically reversible in direction. In many commercial and industrial applications chain hoists are rated to lift one-quarter of a ton, one-half of a ton and one-ton loads. The most widely utilized, commercially available motors having this degree of lifting capacity are three-phase, 208 V alternating current motors.

To operate such motors a three-phase, 208 volt alternating current power supply is required. While some commercial and industrial buildings are wired to provide such power and have suitable wall outlets to provide three-phase, 208 volt alternating current power, many buildings, and even more often specific rooms within buildings, simply lack wall outlets of this type. Therefore, the use of a conventional chain hoist within many buildings and within rooms within buildings is simply not possible since there is no suitable power supply for the chain hoist motor.

While chain hoist motors can be operated utilizing portable generators, this solution is not at all adequate. Portable generators are expensive, noisy, and create noxious fumes. Moreover, they must be located out of doors in order to vent the exhaust gases created. This often results in long, difficult cable runs.

SUMMARY OF THE INVENTION

The present invention provides a very convenient, relatively inexpensive means for providing the requisite power to chain hoist motors. The present invention is a portable alternating current power supply for chain hoist motors that can be operated from conventional single-phase, 110–120 volt, 20 amp alternating current wall outlets. Such outlets are to be found in virtually every commercial and industrial building in this country. The portable power supply of the invention converts this conventional building wall socket single-phase alternating current to a three-phase, 208 volt alternating current output. As a consequence, chain hoist drives can be temporarily brought into a building or room and operated to perform specific tasks despite the absence of any suitable permanent power supply to drive the chain hoist motors. Rather, the portable power supply of the present invention is merely brought into the room, plugged into any 20 amp wall socket outlet, and then is coupled to drive the chain hoist motor. When the task is finished, both the chain hoist and the portable power supply can be quickly and easily removed.

In one broad aspect the present invention may be considered to be a portable three-phase alternating current power supply for a chain hoist motor. The portable power supply is comprised of a portable case for holding electrical components. The portable case includes a control panel that has at least one single-phase power inlet socket, at least one three-phase motor power output socket, and at least one motor control output socket. At least one three-phase inverter is located in the case and is coupled to receive a single-phase electrical power input through the single-phase power input socket. The three-phase inverter provides a three-phase electrical power output through the three-phase motor output socket. At least one motor direction control switch is located in the control panel and is coupled to the motor control output socket. The motor direction control switch has a multiple position selector to alternatively provide up and down signals to the chain hoist motor.

Preferably the power supply of the invention is further comprised of at least one double pole, double throw phase selector switch located in the control panel and connected between the three-phase inverter and the three-phase motor power output socket. The phase selector switch synchronizes chain hoist movement with the labeled direction of the motor direction control selector which is located in the control panel. It also coordinates and synchronizes this movement so as to coincide with associated UP and DOWN indicator lights on the control panel.

Preferably also the portable power supply includes an actuating GO switch in the control panel that is coupled to actuate the three-phase inverter or inverters. Also, an emergency STOP switch is located in the control panel and is coupled in circuit with the motor direction control switch or switches for interrupting both of the UP and DOWN signals to the chain hoist motor. The portable power supply is also preferably provided with electrically operated UP and DOWN indicator lights electrically connected to the multi-position selector for concurrent actuation with the generation of the UP and DOWN signals, respectively. In addition, a delay circuit is preferably coupled between the power input socket and the three-phase inverter.

In another aspect the invention may also be considered to be a portable, three-phase alternating current power supply for operating at least a pair of chain drives independently of each other. A portable power supply of this type is comprised of a portable case for holding electrical components. The portable case includes a control panel that has at least a first single-phase power input socket, at least a pair of three-phase motor power output sockets, and at least a pair of motor control output sockets. Within the case there are at least a pair of three-phase inverters, both of which are coupled to receive single-phase electrical power inputs through the single-phase power input socket. Each of the three-phase inverters is coupled to provide a three-phase electrical power output through a different one of the three-phase motor power output sockets in the pair of motor power output sockets.

At least one pair of motor direction control switches is located in the control panel. Each of the motor direction control switches is coupled to a different one of the motor control output sockets. Each of the motor direction control switches has a multiple positions selector to alternatively provide up and down signals to different ones of the chain hoist motors.

A dual-chain hoist motor power supply is distinctly advantageous when a pair of chain hoists are to be operated in the same vicinity. This quite often occurs in many applications when it is necessary to lift different loads or different ends of the same load in a coordinated fashion. The dual-chain hoist motor power supply not only provides the requisite three-phase, 208 volt alternating current power to both of the chain hoist drive motors, but also permits control of both chain hoist drives independently of each other from the same location. As a result, the manipulation of loads suspended from two separate chain hoists can be easily controlled by a single individual utilizing the control panel of the power supply as an operating control panel.

In a portable power supply for dual-chain hoists of this type, at least a pair of double pole, double throw phase selector switches are located in the control panel. Each different phase selector switch is connected between a single, separate three-phase inverter and a single, separate motor control output socket. An actuating GO switch in the control panel is coupled to actuate all of the three-phase inverters. An emergency STOP switch is located in the control panel and is coupled in circuit with all of the motor direction control switches to interrupt all UP and DOWN signals.

A dual-chain hoist portable power supply of this type may be utilized to provide adequate operating power for two separate quarter-ton chain hoists, two separate half-ton chain hoists, or a single one-ton chain hoist from a single NEMA (National Electrical Manufacturers Association) 110 volt 20 amp alternating current circuit. However, with some modifications, the power supply can be improved even further to provide adequate operating power for two fully loaded one-ton chain hoists.

To achieve this additional operating capability at least a second single-phase power input socket is provided in the control panel. Also, an automatic power selection circuit is coupled between the first and second single-phase power input sockets. The automatic power selection circuit is actuated by a power input to the second single-phase power input socket to automatically divide loads on the three-phase motor power output sockets between the first and second single-phase power input sockets. In the absence of a power input on the second single-phase power input socket, the automatic power selection circuit couples all of the loads on the three-phase power output sockets to the first single-phase power input socket. Preferably a separate delay circuit is coupled between each of the power input sockets and the three-phase inverters.

In still another aspect the invention may be considered to be the combination of at least one chain hoist drive and a portable three-phase alternating current power supply located remotely from the chain hoist drive or drives. Each chain hoist drive is driven by a three-phase electrical motor and has a power input cable and a control input cable coupled thereto. The portable power supply includes a portable case for holding electrical components and includes a control panel with at least one single-phase power input socket, at least one three-phase motor power output socket, and at least one motor control output socket. At least one three-phase inverter is located in the case and is coupled to receive a single-phase electrical power input through the single-phase power input socket. The three-phase inverter provides a three-phase electrical power output through the three-phase motor output socket. At least one motor direction control switch is coupled to the motor control output socket and has a multiposition selector. This selector is located on the control panel and alternatively provides up and down signals to the chain hoist motor. Each power input cable from each chain hoist drives employed is releasably coupled to a separate motor power output socket. Likewise, each control input cable is releasably coupled to a separate motor control output socket.

The invention may be described with greater clarity and particularity by reference to the accompanying drawings.

DESCRIPTION OF THE EMBODIMENT

Figure 1:
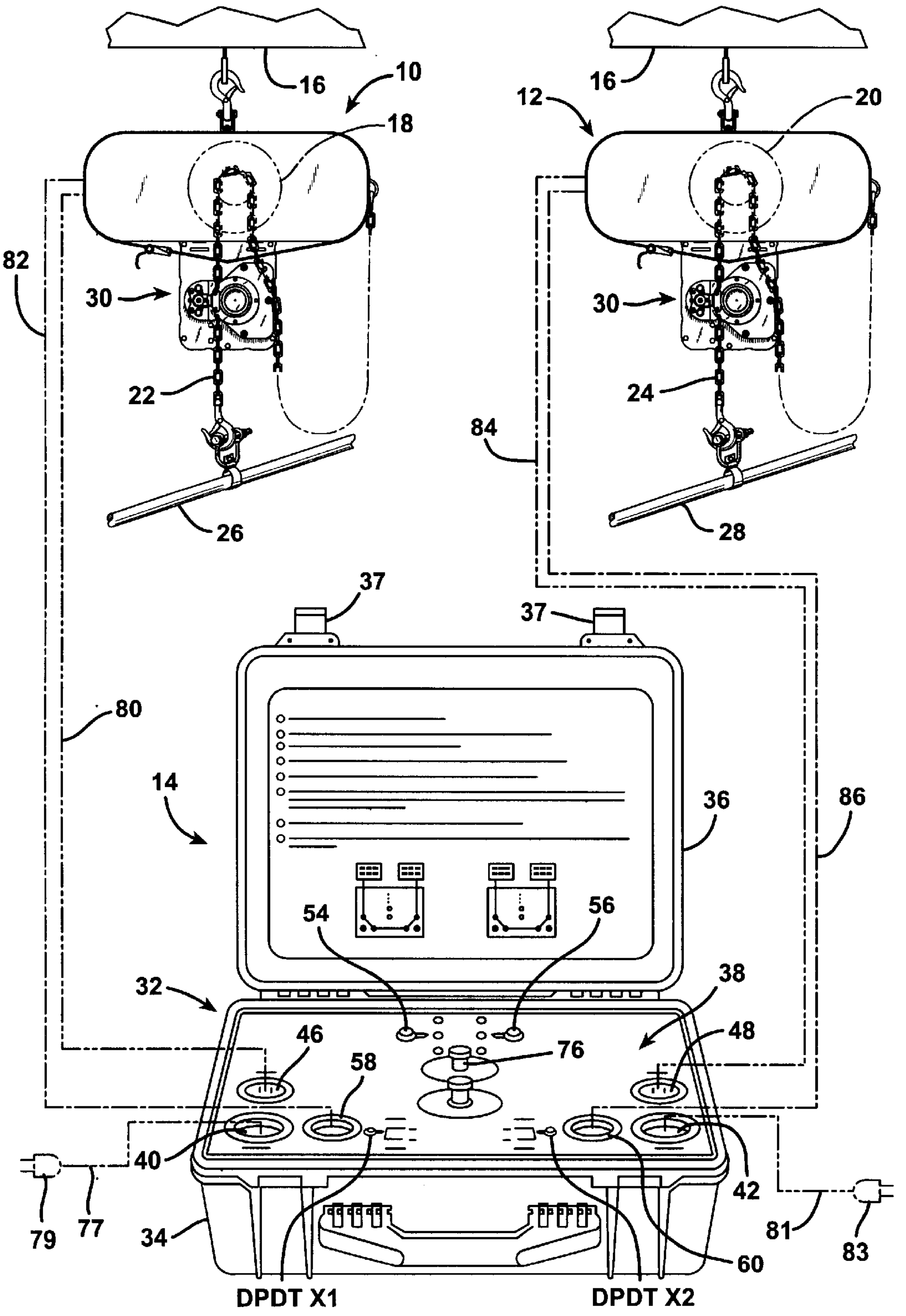
FIG. 1 illustrates a portable three-phase alternating current power supply coupled to independently power and control a pair of chain hoists according to the invention.

FIG. 1 illustrates in combination two different chain hoists 10 and 12, both of which are operated independently from each other by a portable, three-phase alternating current power supply 14 that is located remotely from both of the chain hoists 10 and 12.

In the embodiment shown, both of the chain hoists 10 and 12 are suspended by hooks from an overhead support, which is illustrated as a ceiling 16. Each of the chain hoists 10 and 12 encloses a chain hoist motor, indicated in phantom in FIG. 1. In the embodiment illustrated the chain hoist 10 houses a chain hoist motor 18 which is a reversible three-phase, 208 volt alternating current motor. Similarly, the casing of the chain hoist 12 houses another reversible three-phase, 208 volt alternating current motor 20. The chain hoist motors 18 and 20 respectively drive chains 22 and 24 to raise and lower loads 26 and 28. Each of the chain hoists 10 and 12 is equipped with a separate position encoder assembly 30. The chain hoists 10 and 12 and the position encoder 30 are of the type described in U.S. Pat. No. 6,209,852, issued Apr. 3, 2001, which is hereby incorporated by reference in its entirety.

The portable, three-phase alternating current power supply 14 includes electrical components housed within a heavy-duty plastic case 32 that includes a lower, tub portion 34 to which a lid 36 is connected by hinges along one edge of the lid 36. The opposite edge of the lid 36 may be secured to catches on the tub 34 by latches 37 when the lid 36 is closed. A generally flat, easily accessible control panel 38 is oriented in a horizontal disposition at the top of the tub portion 34 of the case 32 and is visible when the lid 36 is opened, as illustrated in FIG. 1. The portable case 32 may, for example, have dimensions of nineteen inches by sixteen inches by seven and a half inches.

Figure 2:
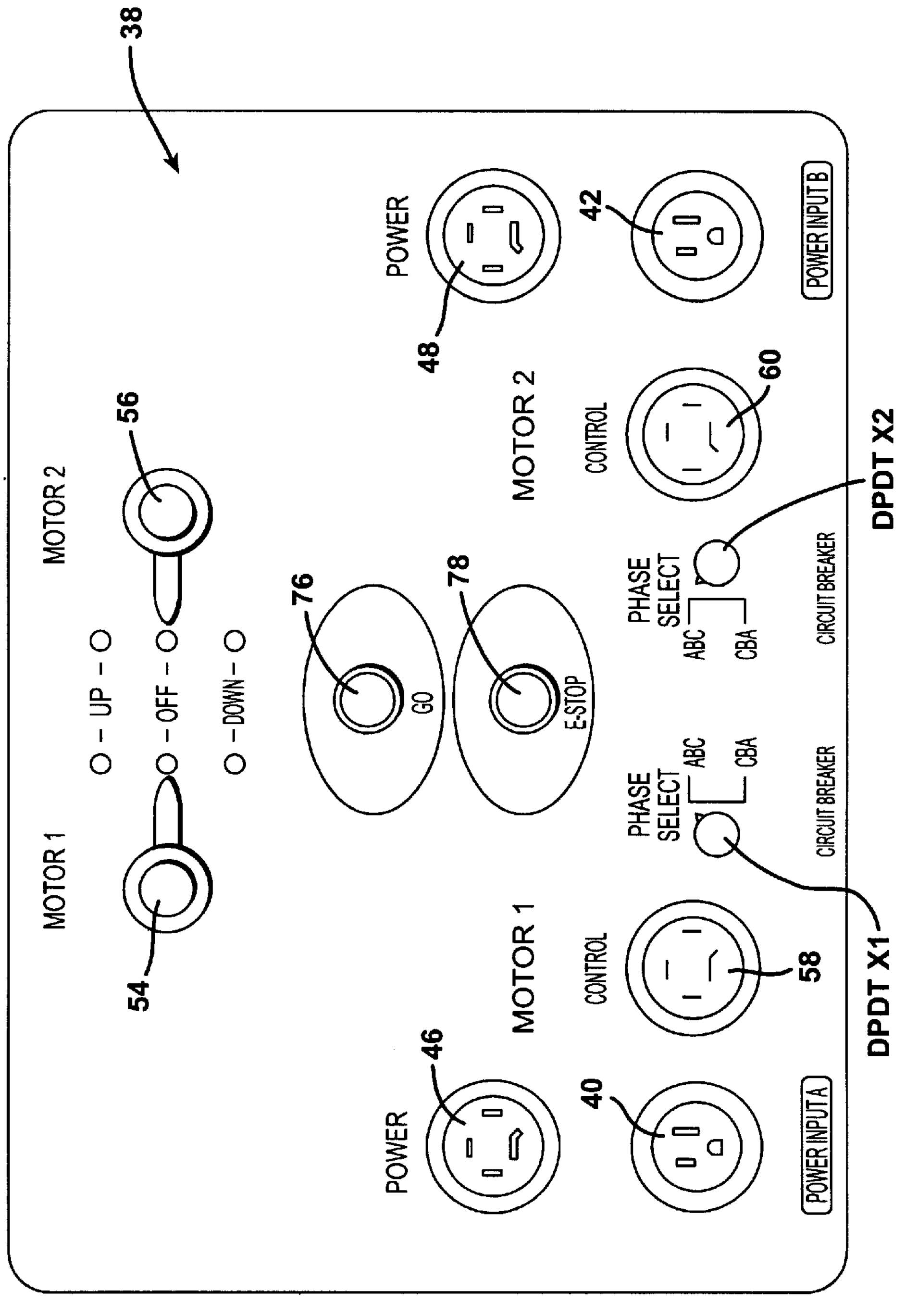
FIG. 2 is a detail plan view of the control panel employed in the power supply illustrated in FIG. 1.

The control panel 38 is illustrated in detail in FIG. 2. The control panel 38 includes first and second single-phase power input sockets 40 and 42, respectively. The control panel 38 also has a pair of three-phase motor power output sockets 46 and 48 and a pair of motor direction control switches S1 and S2, indicated in FIG. 3, that are respectively provided with multiple position selectors 54 and 56, visible in FIG. 2. Manipulation of the selectors 54 and 56 alternatively provides UP and DOWN signals to the chain hoists 10 and 12, respectively. The selectors 54 and 56 also have an intermediate OFF position, as indicated, at which no signal is provided to the chain hoist motors 18 and 20. The control panel 38 also has a pair of motor control output sockets 58 and 60.

Figure 3:
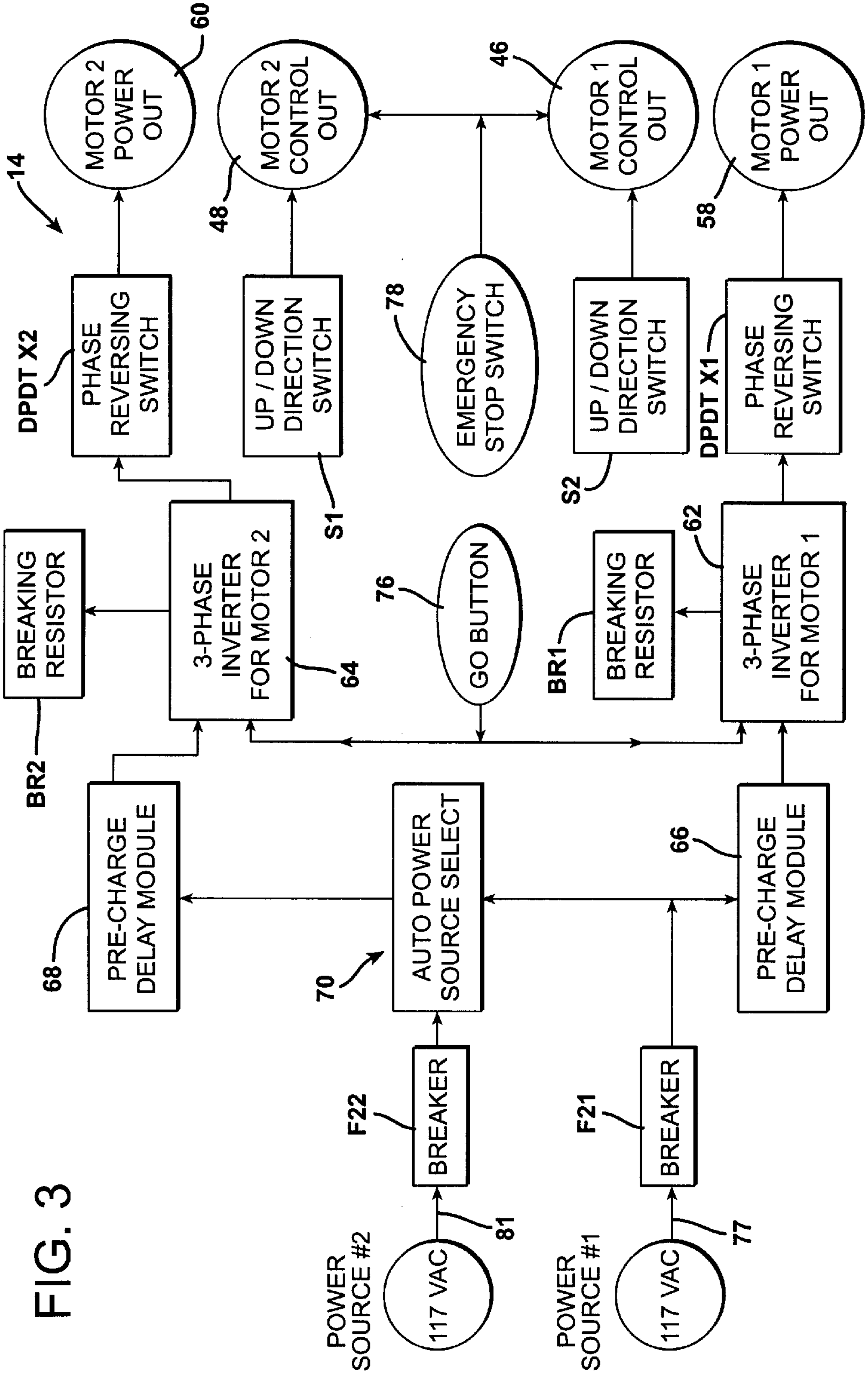
FIG. 3 is a block diagram illustrating the operating components of the portable power supply shown in FIG. 1.
Figure 4A:
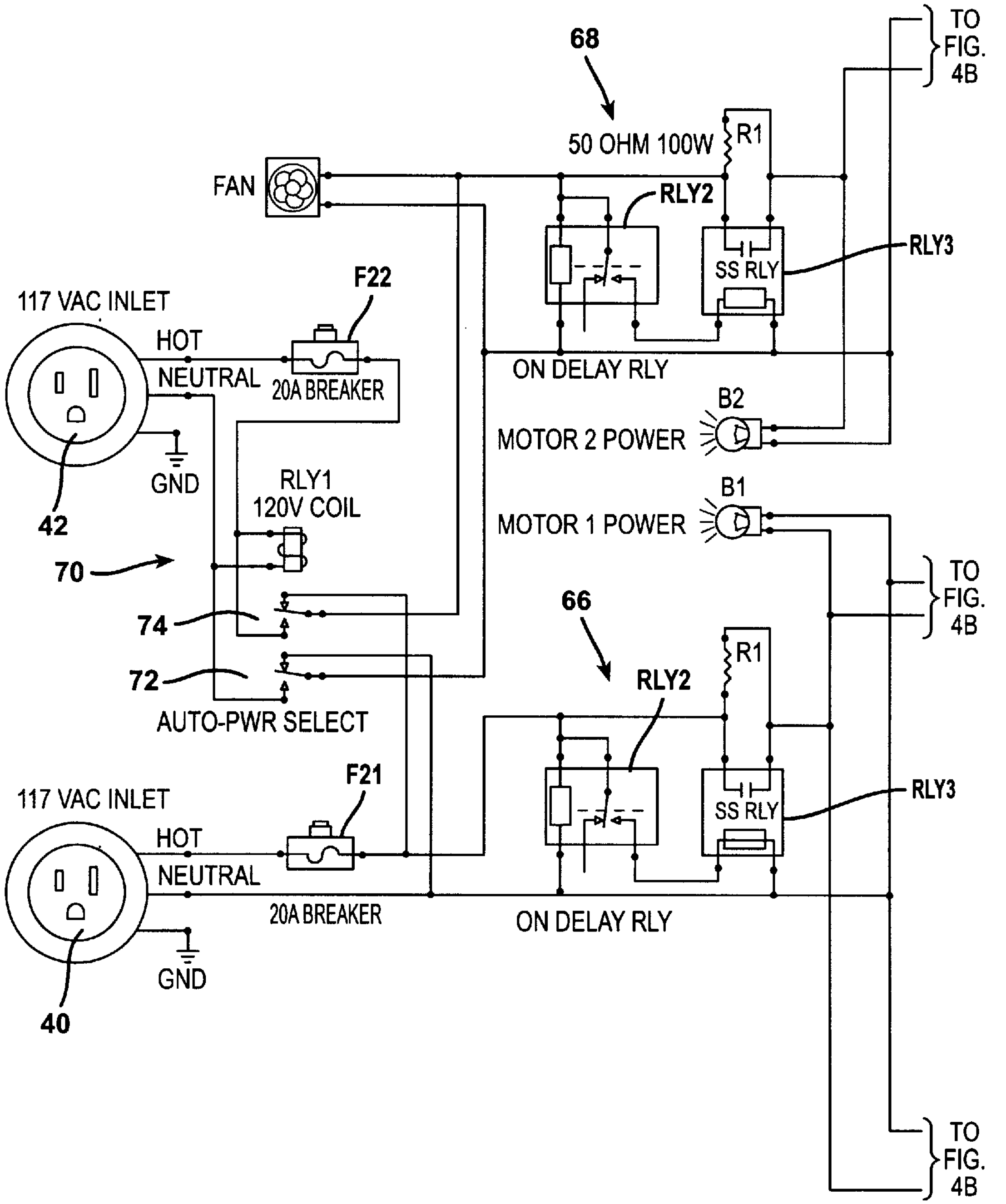
FIG. 4A is the left-hand portion of a schematic diagram of the electrical components of the system of FIG. 3.
Figure 4B:
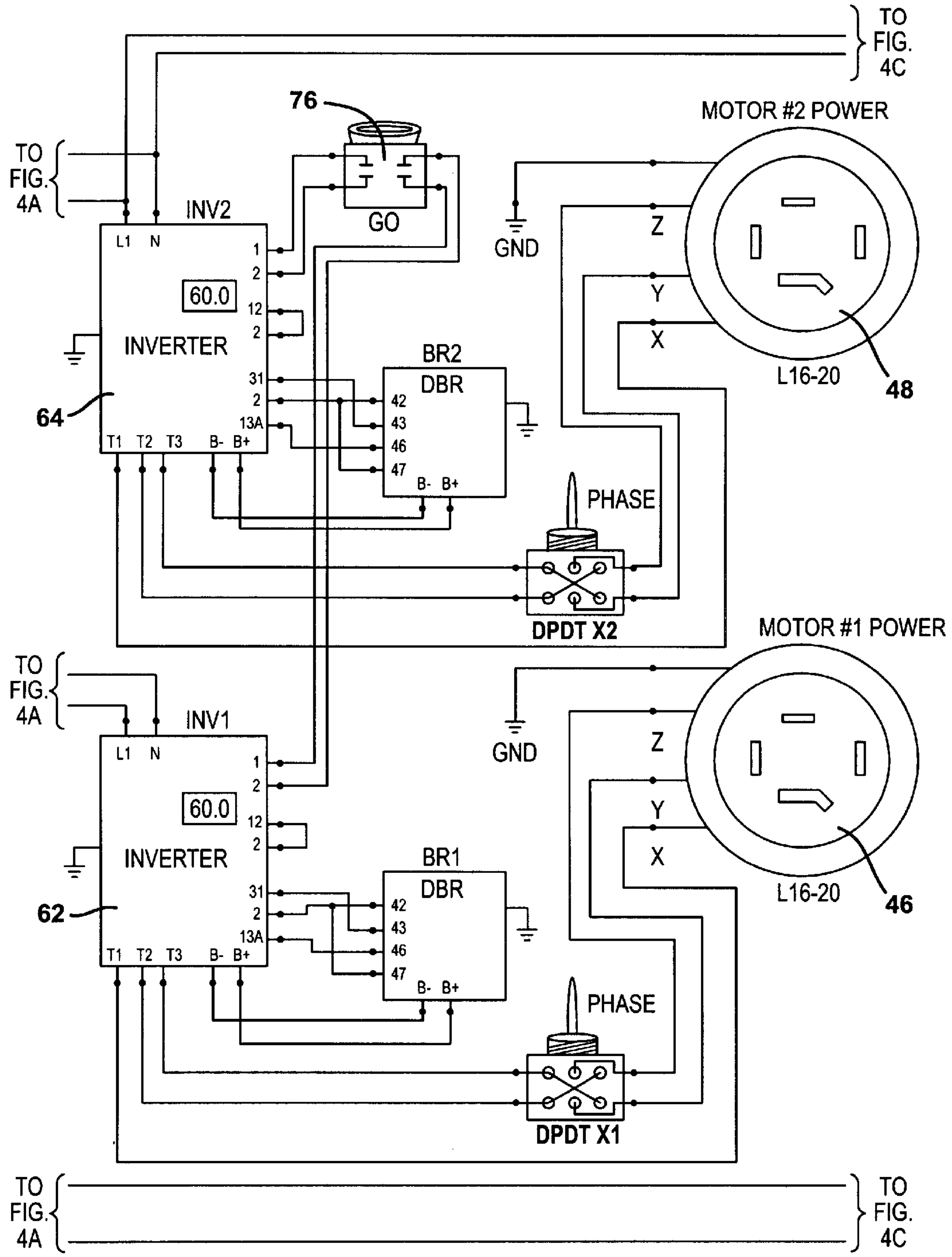
FIG. 4B is the central portion of a schematic diagram of the electrical components of the system of FIG. 3.
Figure 4C:
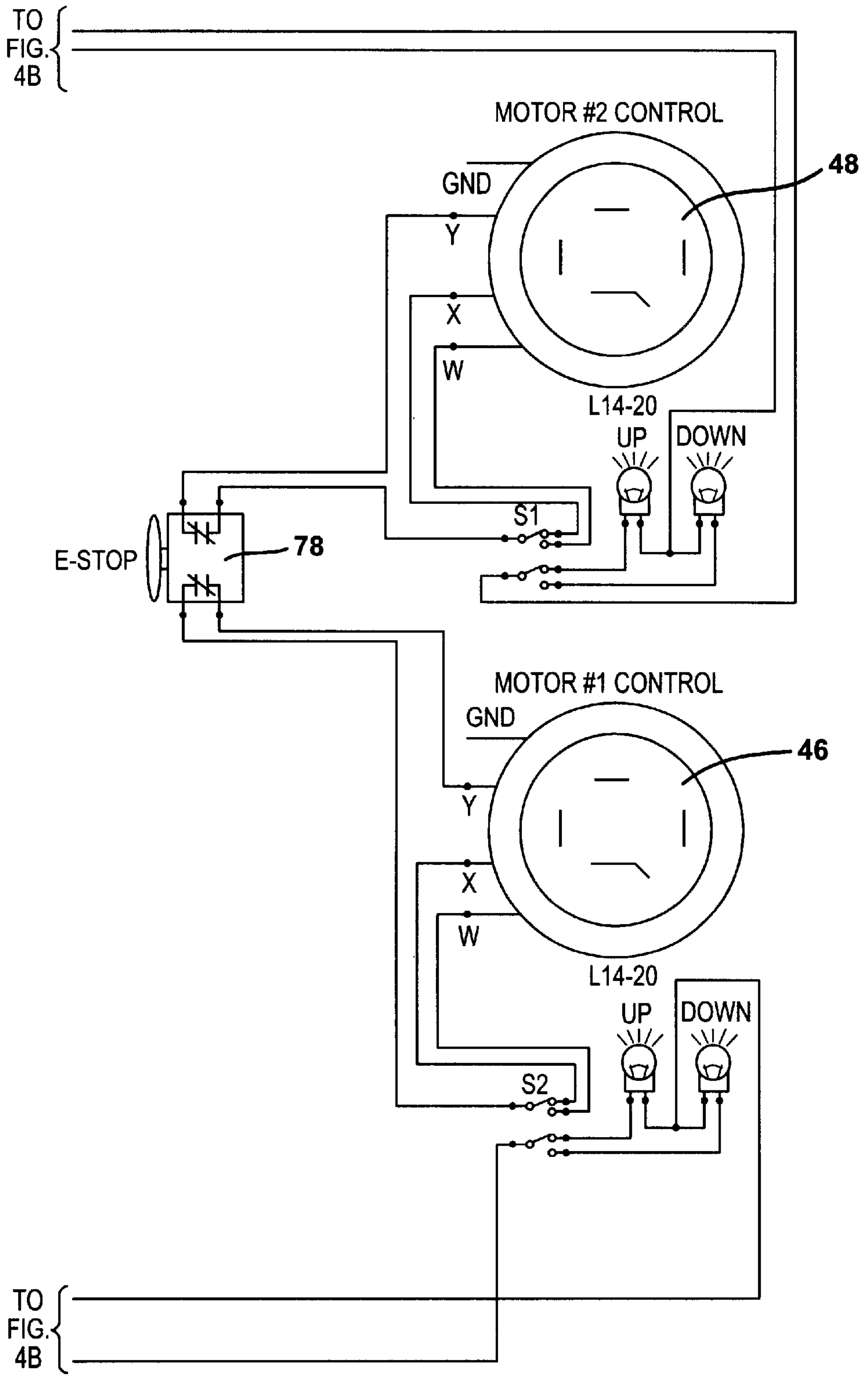
FIG. 4C is the right hand portion of a schematic diagram of the electrical components of the system of FIG. 3.

The operating components of the portable power supply 14 are illustrated in diagram form in FIG. 3 and schematically in FIGS. 4A through 4C. As illustrated, the portable power supply 14 includes a pair of three-phase inverters 62 and 64 that convert single-phase, 110–120 volt, 20 amp alternating current to three-phase, 208 volt alternating current outputs. The two inverters 62 and 64 are sold as SCF Series Variable Speed AC Motor Drives by AC Technology Corporation, 650 Douglas Street, Uxbridge, Mass. 01569.

As illustrated, the three-phase inverter 62 is coupled to receive a single-phase electrical power input from the single-phase power input socket 40 through a 20 amp circuit breaker F21 and through a delay circuit 66 that includes a power on delay relay RLY2 coupled in circuit with a timing relay RLY3. The delay circuit 66 creates a fifteen second delay in the initial provision of power from the single-phase alternating current inlet socket 40 to the three-phase inverter 62. The second single-phase power inlet socket 42 is also provided with a 20 amp circuit breaker F22 and a delay circuit 68 that includes another delay relay RLY2 coupled in circuit with another timing relay RLY3. The use of the delay circuits 66 and 68 prevents the 20 amp circuit breakers F21 and F22, and also the 20 amp circuit breakers in the building wiring, from tripping under the initial load of the inverters 62 and 64.

An automatic power selection circuit 70 that includes a 120 volt relay RLY1 having sets of contacts 72 and 74 is coupled between the first single-phase power input socket 40 and the second single-phase power input socket 42. The automatic power selection circuit 70 is actuated by a power input to the second single-phase power input socket 42 to automatically divide the load on the three-phase motor power output sockets 46 and 48 between the first and second single-phase power input sockets 40 and 42. The automatic power selection circuit 70 otherwise couples all of the loads on the three-phase power output sockets 46 and 48 to the first single-phase power input socket 40, as illustrated in the schematic diagrams of FIGS. 4A, 4B, and 4C.

The portable power supply 14 also includes a GO actuating switch 76, mounted on the control panel 38. Once the delay circuits 66 and 68 have timed out following the provision of an input voltage at the single-phase power input socket 40, and the input socket 42, if power is present at the socket 42, the actuating switch 76 must be depressed in order to actuate the inverters 62 and 64.

The inverter 62 is connected to provide a three-phase, 208 volt alternating current output to the first motor power output socket 46. Similarly, the inverter 64 is coupled to provide a three-phase, 208 volt alternating current output to the second motor power output socket 48. A first double pole, double throw phase selector switch DPDT X1 is connected in circuit between the inverter 62 and the power output socket 46. Similarly, a second double pole, double throw phase selector switch DPDT X2 is connected in circuit between the inverter 64 and the power output socket 48.

The three-phase inverters 62 and 64 are respectively provided with dynamic braking resistor modules BR1 and BR2. Each of these modules employs a dynamic braking resistor circuit that dissipates electrical current in those situations in which the chain motors 18 and 20 will act as current generators. In such situations current would be generated if the chains 22 and 24 were hooked to the ceiling 16, and the chain hoists 10 and 12 traveled up and down their respective chains to raise and lower loads.

The portable power supply 14 is also provided with an emergency STOP switch 78 that is located in the control panel 38. The emergency STOP switch 78 is coupled in circuit with the motor direction control switches 54 and 56 for interrupting both the up and down signals to the chain hoist drive motors 18 and 20.

Separate electrically operated UP, OFF, and DOWN indicator lights are electrically connected to each of the direction control switches S1 and S2 that are operated by the multi-position selectors 54 and 56. The UP, OFF, and DOWN indicator lights associated with each motor control output socket 46 and 48 are illuminated concurrently with the generation of up signals, no signal, and down signals to the chain hoist drive motors 18 and 20 with which they are associated. The power supply operator utilizes the phase selector switches DPDT X1 and DPDT X2 to ensure that the positions of the selectors 54 and 56 and the illumination of the UP, OFF, and DOWN indicator lights are properly correlated and synchronized with the actual signals being provided to the chain hoist motors 18 and 20.

In use, the portable three-phase power supply 14 is transported to the location in or near a building where a single-chain hoist 10, or a pair of chain hoists 10 and 12 are to be operated. The lid 36 of the case 32 is opened and at least one power feeding cable 77 having an equivalent of 12/3 SO or better is utilized. One end of the first power input cable is plugged into the first single-phase power input socket 40. The plug 79 at the other end of the first single-phase, alternating current power input cable 77 is plugged into a conventional 110–120 volt, single-phase, 20 amp electrical wall socket. To reduce the potential for resistance problems, the power input cable length should not exceed 200 feet.

If only a single-chain hoist is to be operated, only a single power input cable 77 is required. Also, both of the chain hoists 10 and 12 can be operated using a single power input cable 77 if both of the chain hoists 10 and 12 are rated at one-quarter ton or one-half ton. When only a single electrical power input cable 77 is employed and is plugged into the single-phase power input socket 40, the relay contacts 72 and 74 of the automatic power selection circuit 70 couple both of the three-phase inverters 62 and 64 to the power input socket 40. With this connection arrangement power to both of the three-phase motor power output sockets 46 and 48 is derived from the single power input at the power input socket 40.

On the other hand, the amperage necessary to operate both of the chain hoists 10 and 12 if both hoists are rated at one ton requires the use of a second power input cable 81 having a plug 83 coupled to a second 110–120 volt, 20 amp alternating current wall socket on a different circuit in the building electrical system. This second power input cable 81 is coupled to the second single-phase power input socket 42 in the control panel 38.

The presence of power being fed into the portable power supply 14 at the second input socket 42 operates the relay RLY1 in the automatic power selection circuit 70 to divide the load between the two power inlets. That is, with this connection the inverter 62 derives power from the first single-phase power input socket 40, converts that power to three-phase electrical current, and supplies a three-phase power output to the motor power output socket 58. Concurrently, the inverter 64 derives power from the second single-phase power input socket 42, converts that power to three-phase electrical current, and supplies a three-phase power output to the motor power output socket 60.

Whether power is derived from one or both inputs at the single-phase power input sockets 40 and 42, the steps in the operator control of the operation of the portable power supply 14 is the same. Specifically, the power input cable 80 of the first chain hoist 10 is plugged into the first three-phase motor power output socket 46 while the control cable 82 to the chain hoist 10 is plugged into the first motor control output socket 58. If the second chain hoist 12 is employed, its power input cable 84 is plugged into the three-phase motor power output socket 48 while its control cable 86 is plugged into the second motor control output socket 60.

With all of the cable connections made as described, both of the chain hoists 10 and 12 can be operated by a single person from the control panel 38. Following the establishment of the cable connections described, the hoist operator depresses the GO actuating switch 76 to enable the power and control output sockets 46, 48, 58, and 60. The hoist operator then manipulates the multiposition selector 54 to turn it to the UP position to raise of the load 26. If, in fact, the three-phase output of the inverter 62 is in the reverse phase from that indicated, the hoist operator rotates the phase selection switch DPDT X1 to the opposite position so that the phase output of the inverter 62 is synchronized with the dial position of the selector 54 and its associated visual indicators. The hoist operator then manipulates the selector 54 to drive the chain hoist motor 18 in the appropriate direction to reel in or play out the chain 22 to raise, halt, and lower the load 26.

In a similar manner the chain hoist operator can concurrently operate the chain hoist motor 20 from the control panel 38 by manipulating the selector 56 to operate the chain hoist motor 20 to reel in or play out the chain 24 to lift, stop, or lower the load 28. The phase selection switch DPDT X2 is manipulated to synchronize the output of the three-phase inverter 64 with the position of the selector 56 and the illumination of its associated UP, OFF, and DOWN lights. Should some emergency condition arise, the chain hoist operator can depress the emergency STOP switch 78 to cut off all driving outputs to both of the chain hoist motors 18 and 20.

Once operation of the chain hoists 10 and 12 has been completed, all of the cables are disconnected from the control panel 38. The lid 36 of the case 32 is closed and the latches 37 are engaged with corresponding catches on the tub 34. The portable power supply 14 can then be readily moved for use at another location.

Undoubtedly, numerous variations and modifications of the invention will become readily apparent to those familiar with chain hoists and chain hoist drive motors. For example, the number of sockets and circuitry employed can be expanded to drive three, four, or even a greater number of chain hoist motors. Accordingly, the scope of the invention should not be construed as limited to this specific embodiment depicted and described, but rather is defined in the claims appended hereto.

We claim:

1. In combination: at least one chain hoist motor and a portable three-phase alternating current power supply comprising:

a portable case for holding electrical components and including a control panel that has at least one single-phase power input socket, at least one three-phase motor power output socket, and at least one motor control output socket, at least one three-phase inverter located in said case and coupled to receive a single-phase electrical power input through said single-phase power input socket and to provide a three-phase electrical power output to said chain hoist motor through said three-phase motor output socket, and at least one motor direction control switch located in said control panel and coupled to said motor control output socket and having a multiple position selector to alternatively provide up and down signals to said chain hoist motor.

2. A combination according to claim 1 wherein said portable power supply further comprises: at least one double pole, double throw phase selector switch located in said control panel and connected between said three-phase inverter and said three-phase motor power output socket.

3. A combination according to claim 1 wherein said portable power supply further comprises: an actuating switch in said control panel coupled to actuate said three-phase inverter.

4. A combination according to claim 1 wherein said portable power supply further comprises: an emergency stop switch located in said control panel and coupled in circuit with said motor direction control switch for interrupting both said up and down signals to said chain hoist motor.

5. A combination according to claim 1 wherein said portable power supply further comprises: electrically operated up and down indicator lights electrically connected to said multiposition selector for concurrent actuation with the generation of said up and down signals, respectively.

6. A combination according to claim 1 wherein said portable power supply further comprises: a delay circuit coupled between said power input socket and said three-phase inverter.

7. A combination according to claim 1 wherein said portable power supply further comprises: a dynamic braking resistor circuit coupled to said three-phase inverter.

8. In combination: at least a pair of chain hoist drives and a portable three-phase alternating current power supply for operating said chain hoist drives independently of each other and comprising:

a portable case for holding electrical components and including a control panel that has at least a first single-phase power input socket, at least a pair of three-phase motor power output sockets, and at least a pair of motor control output sockets, at least a pair of three-phase inverters, both of which are coupled to receive single-phase electrical power inputs through said single-phase power input socket, and each of said three-phase inverters is coupled to provide a three-phase electrical power output through a different one of said three-phase motor power output sockets in said pair of motor power output sockets to a different one of said chain hoist drives, and at least a pair of motor direction control switches located in said control panel, and each of said motor direction controls switches is coupled to a different one of said motor control output sockets and has a multiple position selector to alternatively provide up and down signals to different ones of said chain hoist motors.

9. A combination according to claim 8 wherein said portable three-phase alternating current power supply further comprises: at least a pair of double pole, double throw phase selector switches located in said control panel, each different phase selector switch being connected between a single, separate one of said three-phase inverters and a single, separate one of said motor control output sockets.

10. A combination according to claim 9 wherein said portable three-phase alternating current power supply further comprises: an actuating switch in said control panel coupled to actuate all of said three-phase inverters.

11. A combination according to claim 8 wherein said portable three-phase alternating current power supply further comprises: an emergency stop switch located in said control panel and coupled in circuit with all of said motor direction control switches for interrupting both said up and down signals to all of said chain hoist motors.

12. A combination according to claim 8 wherein said portable three-phase alternating current power supply further comprises: separate sets of up and down directional indicators coupled to each of said motor direction controls switches to indicate the presence of at least said up and down signals.

13. A combination according to claim 8 wherein said portable three-phase alternating current power supply further comprises: at least a second single-phase power input socket in said control panel and an automatic power selection circuit coupled between said first and second single-phase power input sockets and actuated by a power input to said second single-phase power input socket to automatically divide a load on said three-phase motor power output sockets between said first and second single-phase power input sockets, and said automatic power selection circuit otherwise couples all loads on said three-phase power output sockets to said first single-phase power input socket.

14. A combination according to claim 13 wherein said portable three-phase alternating current power supply further comprises: a separate delay circuit coupled between each of said power input sockets and said three-phase inverters.

15. A combination according to claim 8 wherein said portable three-phase alternating current power supply further comprises: separate dynamic braking resistor circuits coupled to each of said three-phase inverters.

16. In combination:

at least one chain hoist drive driven by a three-phase electrical motor and having a motor power input cable and a motor control input cable coupled thereto, a portable three-phase alternating current power supply located remotely from said at least one chain hoist drive, and said power supply includes: a portable case for holding electrical components and including a control panel with at least one single-phase power input socket, at least one three-phase motor power output socket, and at least one motor control output socket, at least one three-phase inverter located in said case and coupled to receive a single-phase electrical power input through said single-phase power input socket and to provide a three-phase electrical power output through said three-phase motor output socket, and at least one motor direction control switch is coupled to said motor control output socket and has a selector located in said control panel and alternatively provides up and down signals to said chain hoist drive, and wherein said motor power input cable of said chain hoist drive is releasably coupled to said motor power output socket in said control panel and said motor control input cable of said chain hoist drive is releasably coupled to said motor control output socket.

17. A combination according to claim 16 further comprising a pair of chain hoist drives as aforesaid, a pair of three-phase motor power output sockets as aforesaid, a pair of inverters as aforesaid, a pair of motor control output sockets as aforesaid, and a pair of motor direction control switches as aforesaid, whereby said motor power input cable of each of said chain hoist drives is releasably coupled to a separate one of said three-phase motor power output sockets in said control panel , and said motor control input cable of each of said chain hoist drives is releasably coupled to its separate one of said motor control output sockets in said control panels.

18. A portable power supply according to claim 17 further comprising at least a second single-phase power input socket in said control panel and an automatic power selection circuit coupled between said first and second single-phase power input sockets and actuated by a power input to said second single-phase power input socket to automatically divide loads on said three-phase motor power output sockets between said first and second single-phase power input sockets, and said automatic power selection circuit otherwise couples all loads on said three-phase power output sockets to said first single-phase power input socket.

* * * * *